(12) United States Patent
Overton et al.

(10) Patent No.: US 8,497,909 B2
(45) Date of Patent: Jul. 30, 2013

(54) VIDEO TIMING DISPLAY FOR MULTI-RATE SYSTEMS

(75) Inventors: Michael S. Overton, Beaverton, OR (US); Xinyu Zhu, Portland, OR (US); Scott A. Johnson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 2884 days.

(21) Appl. No.: 10/885,472

(22) Filed: Jul. 1, 2004

(65) Prior Publication Data

US 2004/0239764 A1 Dec. 2, 2004

Related U.S. Application Data

(63) Continuation-in-part of application No. 10/300,059, filed on Nov. 19, 2002, now Pat. No. 6,975,349.

(51) Int. Cl.
*H04N 17/02* (2006.01)

(52) U.S. Cl.
USPC .......................................... 348/184; 348/194

(58) Field of Classification Search
USPC ................ 348/180, 184–186, 194, 500, 569; 345/440–440.2; 702/66–72; 324/76.41, 76.46, 324/76.47, 76.52, 76.55, 76.64, 76.72, 76.74, 324/76.77, 76.81, 76.83
See application file for complete search history.

(56) References Cited

U.S. PATENT DOCUMENTS

| | | | | |
|---|---|---|---|---|
| 3,786,476 A | * | 1/1974 | Graves et al. | 345/440.1 |
| 4,065,665 A | * | 12/1977 | Rietsch | 702/72 |
| 4,631,533 A | * | 12/1986 | Mark, Jr. | 345/440.1 |
| 4,792,845 A | | 12/1988 | Judge | |
| 4,816,897 A | | 3/1989 | Konishi | |
| 4,875,089 A | | 10/1989 | Judge | |
| 5,010,403 A | * | 4/1991 | Wardzala | 348/180 |
| 5,530,483 A | | 6/1996 | Cooper et al. | |
| 5,617,523 A | * | 4/1997 | Imazu et al. | 345/440 |
| 5,930,445 A | * | 7/1999 | Peters et al. | 386/52 |
| 5,953,018 A | * | 9/1999 | Lam | 345/440 |
| 6,008,855 A | * | 12/1999 | Ikai et al. | 348/447 |
| 6,046,595 A | * | 4/2000 | Wardle | 324/615 |
| 6,069,607 A | | 5/2000 | Everett et al. | |
| 6,097,399 A | * | 8/2000 | Bhatt et al. | 345/440 |
| 6,275,257 B1 | | 8/2001 | Tallman et al. | |
| 6,571,185 B1 | * | 5/2003 | Gauland et al. | 702/68 |
| 6,826,569 B2 | * | 11/2004 | Robertson | 707/6 |
| 7,095,410 B2 | * | 8/2006 | O'Connor | 345/440 |
| 2002/0023271 A1 | * | 2/2002 | Augenbraun et al. | 725/109 |
| 2002/0087599 A1 | * | 7/2002 | Grant et al. | 707/513 |

FOREIGN PATENT DOCUMENTS

| | | |
|---|---|---|
| DE | 3722460 | 1/1989 |
| EP | 0336594 | 10/1989 |
| GB | 2282929 | 4/1995 |

* cited by examiner

*Primary Examiner* — Victor Kostak
(74) *Attorney, Agent, or Firm* — Francis I. Gray; Matthew D. Rabdau

(57) ABSTRACT

A video timing display for multi-rate systems allows a user to quickly, easily and precisely measure the timing difference between video signals of different rates. A graphic display area within a raster display region provides a display of vertical and horizontal timing offsets of one video signal with respect to another video signal as a reference having a different frame rate. The graphic display area includes a reference indicator associated with the reference and timing indicators indicating the timing phases between the video signals, with one of the timing indicators being emphasized. A numeric display area may be provided adjacent the graphic display area to display the actual vertical and horizontal timing differences in appropriate units for the emphasized timing indicator relative to the reference indicator with a precision to one video clock cycle.

25 Claims, 3 Drawing Sheets

VIDEO TIMING DISPLAY FOR MULTI-RATE SYSTEMS

CROSS-REFERENCE TO A RELATED APPLICATION

This is a continuation-in-part of U.S. patent application Ser. No. 10/300,059 filed Nov. 19, 2002 now U.S. Pat. No. 6,975,349.

BACKGROUND OF THE INVENTION

The present invention relates to video timing, and more particularly to a video timing display for multi-rate systems to allow a user to quickly, easily and precisely measure the timing difference between video signals of different rates.

The traditional method for checking timing between video signals is to use a waveform display and a vectorscope. The signal of interest is used as the input and a reference signal is applied to an "external" reference port. First one uses a field rate sweep to check vertical timing. Next one uses a line rate sweep to check horizontal timing. Finally in a composite system one uses an SCH (subcarrier-to-horizontal) mode to insure color frames are aligned and to see the timing with enough precision to match the subcarrier phases.

This traditional method is time consuming, difficult and fraught with possibilities for error. To see the horizontal and vertical timing one must shift the waveform and zoom in on features. As the system is adjusted to the desired timing, the display must be manually positioned to follow. Checking the horizontal timing may be imprecise because of the slow rise times of the video sync pulses. Also not all monitors display SCH correctly when in external reference mode so alignment of color frames is problematic. Finally one may have to switch between internal and external reference mode, or switch between the inputs, to compare the timing of the signals.

An alternative method of timing offset determination is to look at a picture relative to the external reference. This has the advantage of showing both the horizontal and vertical offset at the same time. Unfortunately it is difficult to be precise with this method and it is not well suited for checking color frame alignment.

With traditional methods timing reference measurement requires that the line and frame rate of the input be an integer multiple of the reference rates. If this requirement is not met, the measurement results are non-deterministic, and thus cannot be used. One example, as shown in FIG. 1, are the timing differences between a 24 Hz video relative to a 30 Hz video as a reference. For each frame of the 30 Hz reference there is one of four possible delays—d1, d2, d3, d4—to the next frame of the 24 Hz input. The pattern repeats after five frames of the 30 Hz input signal or four frames of the 24 Hz signal. Each group of frames comprises a "superframe" for each signal—five frames for the 30 Hz signal and four frames for the 24 Hz signal. If one simply divides the 30 Hz signal by four, then one is effectively choosing one of these phases and one will randomly end up with any of these four delays as the detected timing. Also some video signal combinations with different rates have different numbers of possible phases. Other common standards have either two or five such ambiguous phases, for example.

SMPTE 318M provides one possible way out of this ambiguity for some combinations. The SMPTE 318M standard specifies an extension to carry a ten-field sequence identification on an NTSC black signal to be used as a reference. The ten-field signal is five frames long, so it effectively identifies which of the five delays is the "correct" one and eliminates the other four. Unfortunately many video signals do not carry the SMPTE 318M ten-field identification flags, so other methods are still needed.

Another method looks at the multiple possible phases and selects the smallest offset. The waveforms are then displayed as if that was the correct timing. This works in many cases, but it does not illustrate to a user what choice was made, nor does it allow for locking to a particular phase of one of the video signals as a reference and measuring timing for multiple video signals, so it really does not provide for timing one video signal to another of the same rate via a known relationship to the reference at a different rate.

What is desired is a mechanism and display to allow a user to quickly and easily measure the timing difference between video signals of different rates.

BRIEF SUMMARY OF THE INVENTION

Accordingly the present invention provides a video timing display for multi-rate systems that allows a user to quickly, easily and precisely measure the timing difference between video signals of different rates. A graphic display area within a raster display region provides a display of vertical and horizontal timing offsets of one video signal with respect to another video signal as a reference. The graphic display area includes a reference indicator in the graphic display area indicating timing for the reference and timing indicators in the graphic area indicating the timing phases of the one video signal with respect to the reference, with one of the timing indicators being emphasized—generally the one closest to the reference indicator. A numeric display area may be provided adjacent the graphic display area to display the actual vertical and horizontal timing differences in appropriate units for the emphasized timing indicator with a precision to one video clock cycle. Also the video signal which is the source of the reference and optionally an alarm when the timing between the two video signals is outside predetermined limits may be shown in the numeric display area. For an instrument having a tiled raster display a vector display may be shown in conjunction with the timing display to provide fine subcarrier phase discrimination between analog composite video signals for hue matching.

The objects, advantages and other novel features of the present invention are apparent from the following detailed description when read in conjunction with the appended claims and attached drawing.

DETAILED DESCRIPTION OF THE INVENTION

Figure 1:
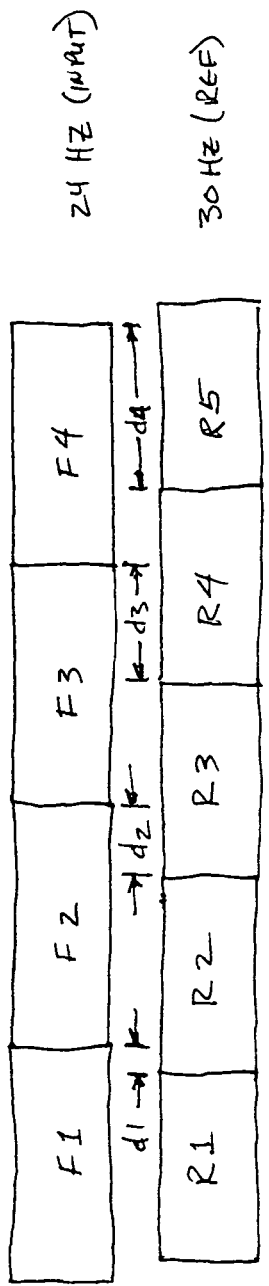
FIG. 1 is a graphic view illustrating a traditional timing measure between a 24 Hz video signal and a 30 Hz video signal as a reference.
Figure 2:
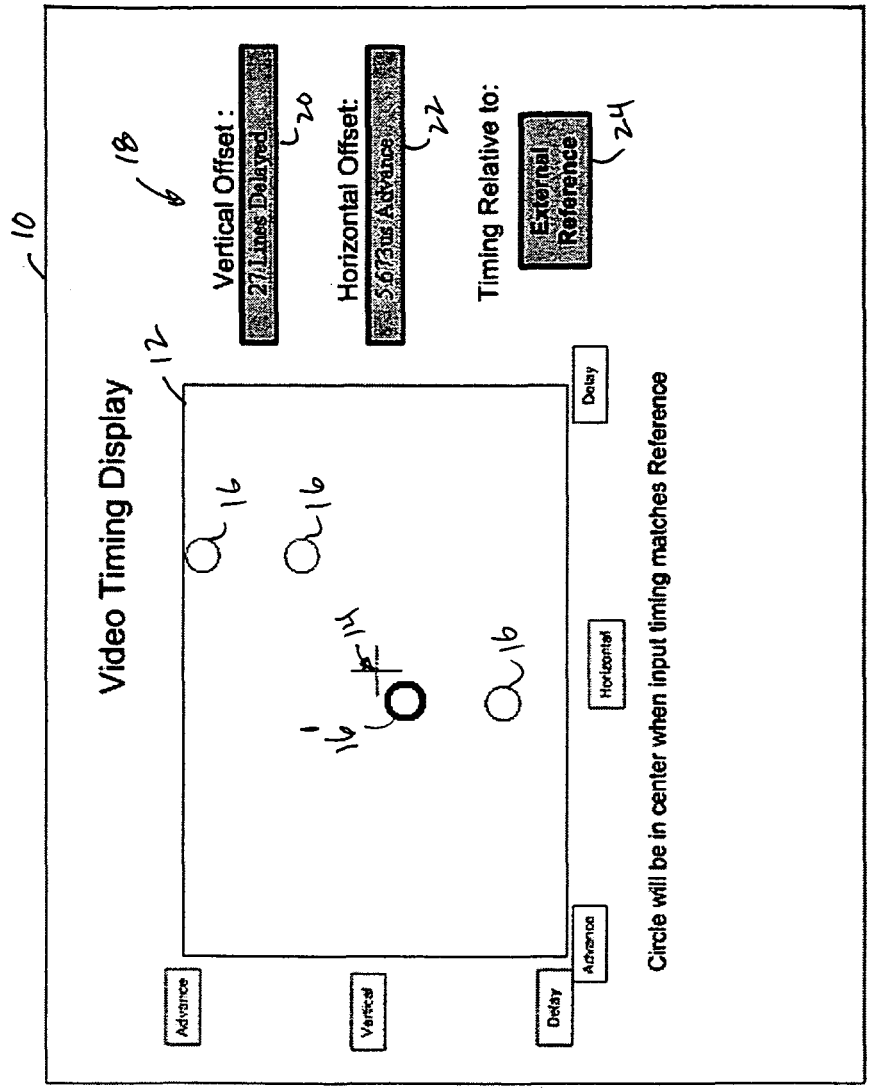
FIG. 2 is a plan view of a video timing display according to the present invention.

Referring now to FIG. 2 a video timing display according to the present invention is shown. In this example a two-dimensional display is shown. A graphic display area 12 within a raster display region 10 has vertical timing along one axis and horizontal timing along the other. In the center of the graphic display area 12 is a reference indicator 14 representing a reference timing position for a video signal used as a reference. Timing indicators 16 also are shown to visually depict the timing of each phase of another video signal having a different rate with respect to the reference. A numeric readout area 18 adjacent the graphic display area 12 may be provided to display numeric values for vertical offset 20 and horizontal offset 22 for one of the timing indicators 16'—generally the one closest to the reference indicator 14. Alternatively the numeric readout area 18 may display the vertical and horizontal offsets for all of the timing indicators 16. The one timing indicator 16' is displayed with more emphasis as a primary indicator, while the other timing indicators 16 are displayed with less emphasis as secondary indicators. The smaller number of m and n in the common multiple equation m×F=n×R determines the total number of timing indicators 16, where F is one video frame rate and R is the other video frame rate. In FIG. 1 m and n are 5 and 4 respectively for the example where the reference has a 30 Hz frame rate and the other video signal has a 24 Hz frame rate (5×24=4×30). Also provided on the display is a reference source indicator 24 that indicates what video signal is being used as the reference. The horizontal axis of the graphic display area 12 is line timing advance or delay, and the vertical axis timing is the timing within the frame. When the emphasized timing indicator 16' is aligned with the reference indicator 14, then the video signal is correctly timed to the reference. To uniquely determine the timing between the video signals, the line and frame rates of the one video signal need not be an integer multiple of the rates for the reference. The present example illustrates the ratio of 5:4 which produces four phases, but any number of phases may be accommodated although the display gets quite busy above ten.

A reference with SMPTE318M may be used. In this case the relationship defined by the SMPTE318M sequence is the "correct" timing relationship and that indicator is the one marked with emphasis instead of the one nearest the reference indicator 14.

The reference indicator 14 may be, for example, in the form of a cross in the center of the graphic display area 12, as shown in solid, or may be extended to the full width of the graphic display area with tic marks representing rough offset divisions—Y lines per division or X microseconds per division according to the video standard of one of the video signals. The timing indicators 16 may be of any suitable form, such as the circles shown by way of illustration.

The width of the horizontal axis as shown in this embodiment is one video line, so the scale is +/−½ line. The vertical dimension changes depending upon the format of the video signal or the reference. For interlaced digital video the vertical dimension is one frame (two fields), for composite video such as NTSC and PAL it is one color frame (four or eight fields), and for progressive video it is one field.

The numeric information provides a more precise result than the graphical method alone without having to expand the display. Both the graphical display and the numeric readout are shown in terms of the horizontal and vertical dimensions. This is convenient to a user since that is how the adjustment to correct timing is presented.

As shown by the reference source indicator 24 the timing of one video signal is relative to an external video signal as the reference. This is effectively an absolute mode in that the external video signal represents a timing standard for a video facility, for example. The user may also choose another video signal as the basis for the display. In that case the first video signal is compared to the external video signal, and the offset is stored as a "baseline". Subsequent input video signals may then be compared to the baseline. In this mode the baseline timing is represented by the reference indicator 14, and the reference source indicator 24 shows "Stored Baseline". This latter mode is useful in timing various video signals input to a switcher, since in this case the absolute timing with respect to an external video signal is not important. What is important is that all the video signals input to the switcher arrive at the same time. By using one of the video signals to generate the stored baseline, then timing the rest of the video signals to match, the display affords an easy way to time down a switcher.

Figure 4:
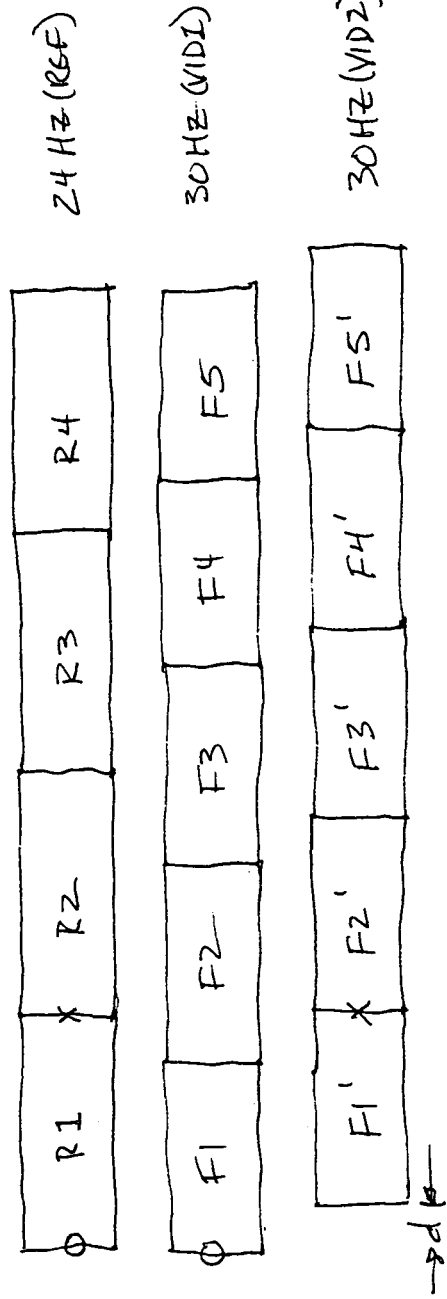
FIG. 4 is a graphic view illustrating timing between video signals at one rate using as a reference a video signal of another rate according to the present invention.

To measure the difference between two video signals having a common rate via their relationship to the reference having a different rate, it is not just the smallest difference that is chosen. Instead, as shown in FIG. 4, the edge or phase of the reference (highlighted) used when measuring the baseline with reference to one video signal VID1 is preserved (indicated by "o"), and it is this phase of the reference that is used for timing a subsequent video signal VID2. To do this the reference is considered to have "superframes", with each frame of the reference within the superframe defining a phase of the reference. For the example where the reference has four frames in the same period of time as five frames of the video signal, the timing with respect to VID1 defines the phase of the reference (R1) that is "locked" so that the subsequent video signal VID2 is timed to the same phase, i.e., every fourth frame of the reference is used for timing. If the "nearest" timing was used (indicated by "x"), VID2 would be timed with R2 of the reference which results in VID1 and VID2 not being timed to each other. This mode may be invoked by the user when needed, and provides in the "relative to" box the statement "baseline with locked reference." In this mode the timing circle with emphasis may not necessarily be the one closest to the center, but rather it is the one defined by the locked reference divider relationship. This mode needs to be reestablished if the reference loses lock or if more than a fixed time expires, such as one hour. Also, not shown, is a "Display Scaling" option that allows graphical and numeric readouts to be parsed into horizontal and vertical advance or delay values according to the raster structure of the input or the reference.

For a digital switcher the display has more precision than is needed since most switchers have some allowance for timing errors on their inputs. Analog composite switchers are not so forgiving. For the analog applications the present display may be used to get within a video clock cycle, and then a vectorscope or other method may be used to get the very fine discrimination of the subcarrier phase. This is very convenient for an instrument having a "tiled" display, since the vector display may be displayed simultaneously with the timing display.

Other uses for the timing display include automation. Since the timing display gives numeric results, it is possible to read the timing error and apply the necessary timing correction via an automation system to the input video signal without user intervention. This allows significant time savings in setting up for a video production.

Graticules may be added to show an allowable range for timing on less critical situations. These may be horizontal and vertical bars that define a smaller window within the graphic display area 12 around the reference indicator 14. If the closest timing indicator 16' is within the box, then the timing is OK. Once a region of acceptable timing is defined, it is possible to generate an alarm if the timing is outside the region. This alarm may use instrument reporting methods, such as SNMP (System Network Management Protocol—Internet Engineering Task Force (IETF) Request for Comment (RFC) 1157) traps, on-screen icons and ground closures to inform the user or automation system of the situation.

Figure 3:
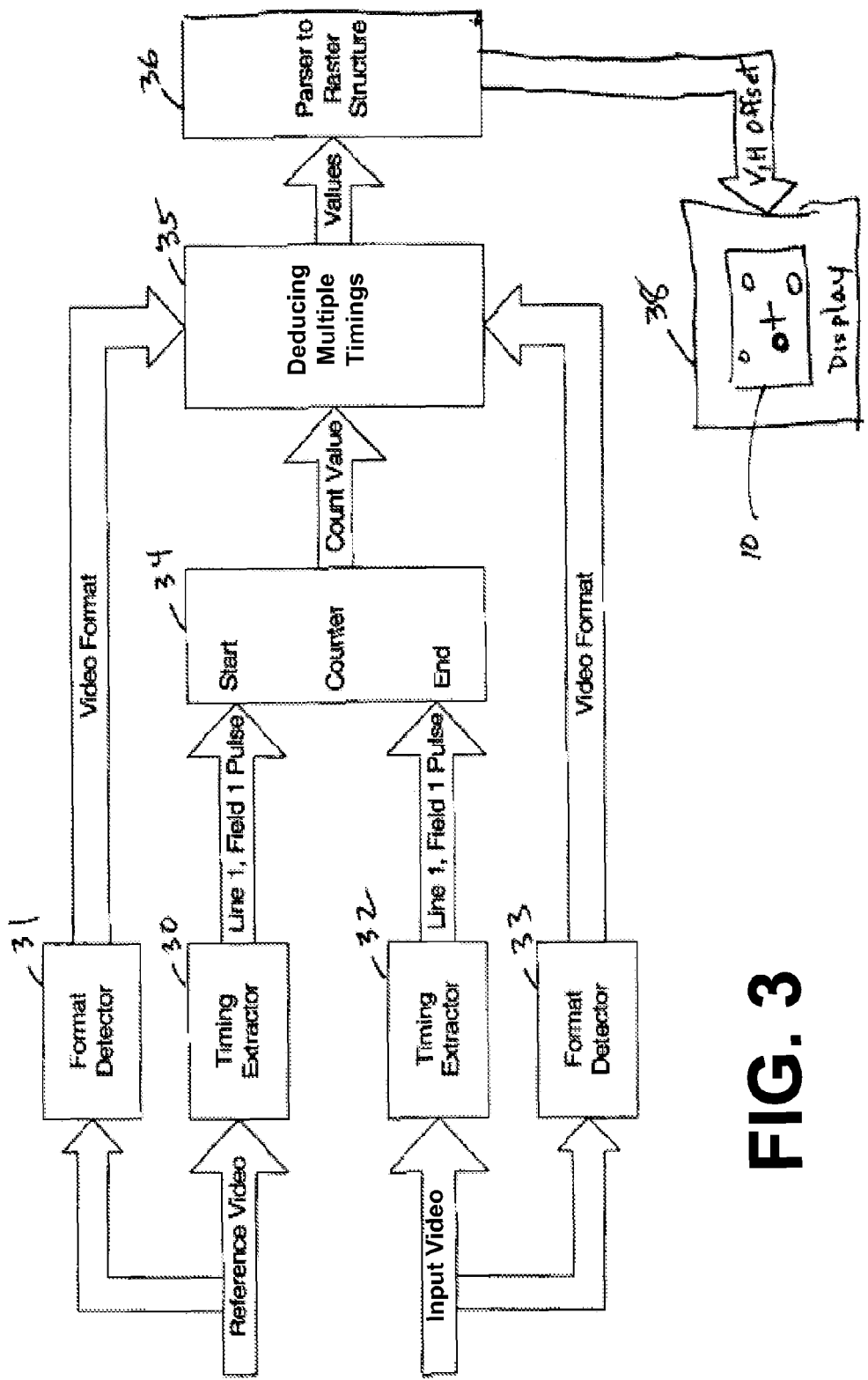
FIG. 3 is a simple block diagram view of an apparatus for generating a video timing display according to the present invention.

As shown in FIG. 3 a particular implementation has six parts. The video signals are input to respective timing extractors 30, 32 which detect line one of field one for both video signals, at which time a pulse is generated. A counter 34 is used to measure the time difference, d, between the pulses extracted from the two video signals. One of the pulses starts the counter 34, which counts video clock cycles derived generally from the reference timing extractor 30, and the other one of the pulses stops the counter. The respective video formats are detected by format recognition circuits 31, 33. The detected results are used by a deduction calculator 35. The deduction calculator 35 computes all possible timing values using the common multiple $m \times F = n \times R$ relationship based upon the value d from the counter 34 and the detected formats, i.e., the detected different frame rates.

For some frame rates it may take a long time for all phases to occur. This may make for a very slow update rate for the display, making it difficult to use. Therefore the present method only needs to measure one phase between the two video signals. Then using the known structures of the different formats for the video signals, the other phases may be calculated by the deduction calculator 35. The phase values from the deduction calculator 35 are input to a parser 36 which parses the phase values into horizontal and vertical advance or delay according to the raster structure of one of the video signals. The results from the parser 36 are then provided to an instrument display 38 in the raster display region 10 as the timing display shown in FIG. 2. The results also may be output to an automation.system to provide automatic timing adjustment for the input video signal.

Although the example described above is of a two-dimensional display, the basic concept is the display of multiple phases between video signals of different frame rates simultaneously regardless of the particular display format used. Therefore the display could be linear (one-dimensional) or multi-dimensional (three or more).

Thus the present invention provides a timing display for multi-rate systems by determining from the formats of different video signals and from a count derived from the difference in time between a common reference point in each video signal a plurality of phase values that are presented on a display via appropriate indicators with respect to a reference indicator.

What is claimed is:

1. A video timing display for measuring timing difference between video signals having different rates comprising a graphic display area on a display screen, the graphic display area including a reference indicator associated with one of the video signals and a plurality of timing indicators where the number of timing indicators represents the number of different phases between the video signals.

2. The video timing display as recited in claim 1 further comprising a numeric display area on the display screen adjacent the graphic display area for displaying absolute timing offsets between the video signals.

3. The display as recited in claim 2 further comprising a reference source indicator in the numeric display area.

4. The display as recited in claim 3 wherein the reference source indicator comprises an alphanumeric indicator representing a reference selected from the group consisting of an external video signal and a baseline input video signal as the video signals.

5. The display as recited in claim 1 wherein the reference indicator comprises a cross centered in the graphic display area.

6. The display as recited in claim 1 wherein the timing indicators comprise circles, with one timing indicator being emphasized.

7. The display as recited in claim 6 wherein the one timing indicator is closest to the reference indicator.

8. The display as recited in claim 6 wherein the one timing indicator represents timing locked to a phase of a superframe of the video signal associated with the reference indicator.

9. An apparatus for measuring timing between video signals having different rates comprising:
   means for extracting a pulse from each video signal corresponding to a common reference point in each video signal;
   means for determining an interval between the two pulses;
   means for determining a video format for each of the video signals;
   means for deducing, from the video formats and the interval, phase values between the video signals;
   means for parsing the phase values to generate a horizontal timing offset and a vertical timing offset for each phase value; and
   means for displaying the horizontal and vertical timing offsets for each phase value as a timing display.

10. The apparatus as recited in claim 9 wherein the timing display comprises a graphic display area on a display screen for displaying the horizontal and vertical timing offsets, the graphic display area including a reference indicator for one of the video signals as a reference and a plurality of timing indicators where the number of timing indicators represents the number of phase values.

11. The apparatus as recited in claim 10 wherein the timing display further comprises a numeric display area on the display screen adjacent the graphic display area having regions for displaying absolute timing offsets between the video signals.

12. The apparatus as recited in claim 10 wherein the timing display further comprises a reference source indicator in the numeric display area.

13. The apparatus as recited in claim 12 wherein the reference source indicator comprises an alphanumeric indicator representing the reference video signal being selected from the group consisting of an external reference video signal and a baseline input video signal.

14. the apparatus as recited in claim 10 wherein the reference indicator comprises a cross centered in the graphic display area.

15. The apparatus as recited in claim 10 wherein the timing indicators comprise circles, with one of the timing indicators being emphasized.

16. The apparatus as recited in claim 10 further comprising means for identifying a phase of a superframe of the reference a baseline reference to which the video signals are timed.

17. The apparatus as recited in claim 15 wherein one of the timing indicators for the video signals is emphasized that represents timing locked to the identified phase from the identifying means.

18. A method of displaying timing between video signals in a multi-rate system comprising the steps of:
   determining a plurality of phases between a pair of video signals having different rates; and
   providing a graphic representation on a display of the phases in the form of timing phase indicators relative to a reference indicator associated with one of the pair of video signals.

19. The method as recited in claim 18 wherein the providing step comprises the steps of:
   parsing the phases in terms of the raster structure of one of the pair of video signals; and
   providing the parsed phases as the timing phase indicators on the display.

20. The method as recited in claim 18 wherein the determining step comprises the steps of:
   measuring an initial phase between a start of a frame in one of the pair of video signals as a reference to the start of a frame in the other of the pair of video signals; and
   from the initial phase and knowledge of the different rates, calculating the phases.

21. The method as recited in claim 18 further comprising the steps of:
   determining from the phases a specific frame in a superframe for one of the pair of video signals used for a reference as a baseline timing point, the superframe being related to the different rates; and
   timing another of the video signals to the baseline timing point to produce the timing phase indicators.

22. The method as recited in claim 18 further comprising the step of timing the pair of video signals by adjusting the timing for one relative to the other so one of the timing phase indicators is coincident with the reference indicator.

23. The method as recited in claim 18 wherein one of the timing phase indicators is emphasized on the display.

24. The method as recited in claim 23 wherein the emphasized timing phase indicator is closest to the reference indicator.

25. The method as recited in claim 21 wherein one of the timing phase indicators locked to the baseline timing point is emphasized.

* * * * *